April 8, 1941.                    W. KRODEL                     2,237,352
                         LENS MOUNTING FOR EYEGLASSES
                            Filed Nov. 30, 1939
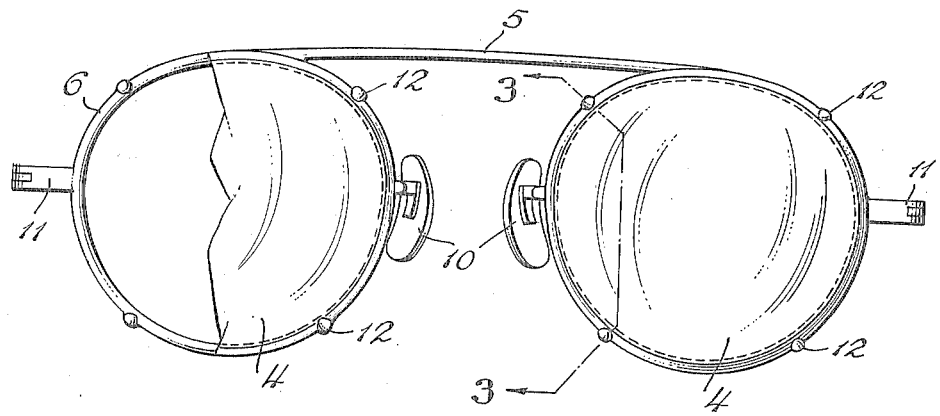
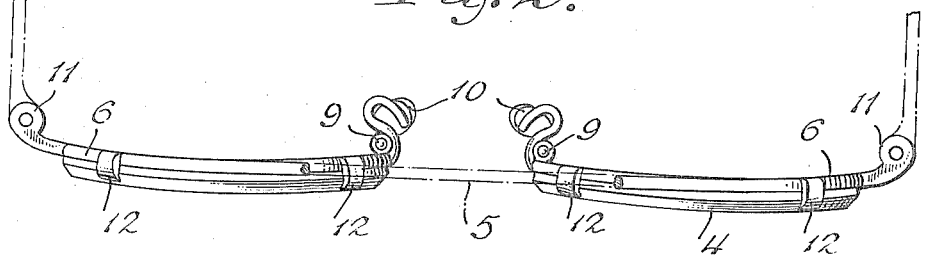
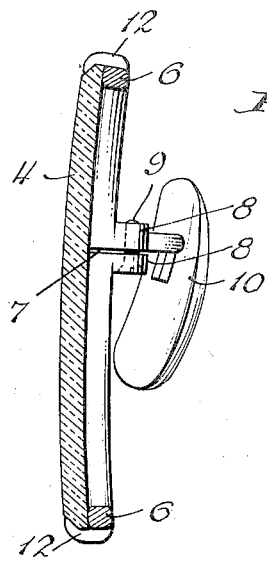
INVENTOR.
WILLIAM KRODEL
BY
ATTORNEYS

UNITED STATES PATENT OFFICE 2,237,352

LENS MOUNTING FOR EYEGLASSES

William Krodel, New Hyde Park, N. Y., assignor to T. & P. Optical Mfg. Co., Inc., New York, N. Y., a corporation of New York Application November 30, 1939, Serial No. 306,783

1 Claim. (Cl. 88—47)

This invention relates to improvements in eyeglasses and has particular reference to a lens mounting therefor.

An object of the invention is to provide an improved mounting of simple and practical construction which will enable a lens to be securely and rigidly supported in a position in front of the associated lens member of a spectacle frame so that said member will be substantially hidden behind the lens, whereby there is imparted the appearance of a rimless eyeglass.

The above and other objects will appear more clearly from the following detailed description when taken in connection with the accompanying drawing which illustrates a preferred embodiment of the inventive idea.

In the drawing:

Figure 1 is a front elevation of a pair of eyeglasses constructed in accordance with the invention, one of the lenses being broken away.

Figure 2 is a top plan view of the eyeglasses, the bridge being broken away and indicated in dotted lines, and Figure 3 is a section substantially taken on the line 3—3 of Figure 1.

Referring more particularly to the accompanying drawing, the numeral 4 indicates the lenses of a pair of eyeglasses which, in the form shown, are beveled around the edge of the outer face of the lens.

The frame for the lenses comprises a bridge 5, the ends of which are connected to the lens members 6 in front of which the lenses 4 are supported, the lenses and their members being preferably of the same size and contour so that said members will be positioned entirely behind the lenses when the latter have been mounted. Each lens member 6 is in the form of a split ring, as best indicated at 7 in Figure 3, and the meeting ends of the member are provided with opposed enlargements 8 through which extends a fastening screw 9 used to contract the member 6 when securing a lens thereto. The nose pad 10 may be secured to one of the enlargements 8, while a temple end piece 11 extends from the member 6 at the side thereof opposite the nose pad 10.

For the purpose of securing the lens 4 to the member 6, there is provided at intervals about the periphery of said members, a plurality of forwardly extending prongs 12 which engage over the outer or peripheral edge of the lens 4 so that when the ends of the member 6 are brought together by the screw 9, said prongs 12 will grip the edge of the lens and tighten the rear peripheral surface thereof against the outer face of the supporting member 6. With the lens so disposed in a plane in front of the member 6, it will be apparent that the latter will hardly be visible through the lens and will, by reason of the prongs 12, securely maintain the lens in position so as to prevent any shifting thereof relative to the supporting frame.

What is claimed is:

The combination with a pair of lenses having their outer peripheral edges beveled; of a frame for said lenses including lens members each extending coincidentally with and completely around the peripheral edge of its associated lens and engaging only the rear face thereof and each divided to form separable ends terminating in opposed enlargements, lens clamping lugs disposed at intervals on the outer periphery of said lens member and having free extremities extending forwardly therefrom for overlying and clamping engagement with the beveled edge of its lens, a nose pad arm secured to one of the enlargements of each lens member, and a fastening element extending through the enlargements of each lens member and for contracting the latter so as to effect clamping engagement of said lugs with said lens, said fastening element and lugs constituting the sole means of securing each lens to its lens member.

WILLIAM KRODEL.